(No Model.)
J. A. SHIMP.
CORN SHOCKER.
No. 537,367. Patented Apr. 9, 1895.
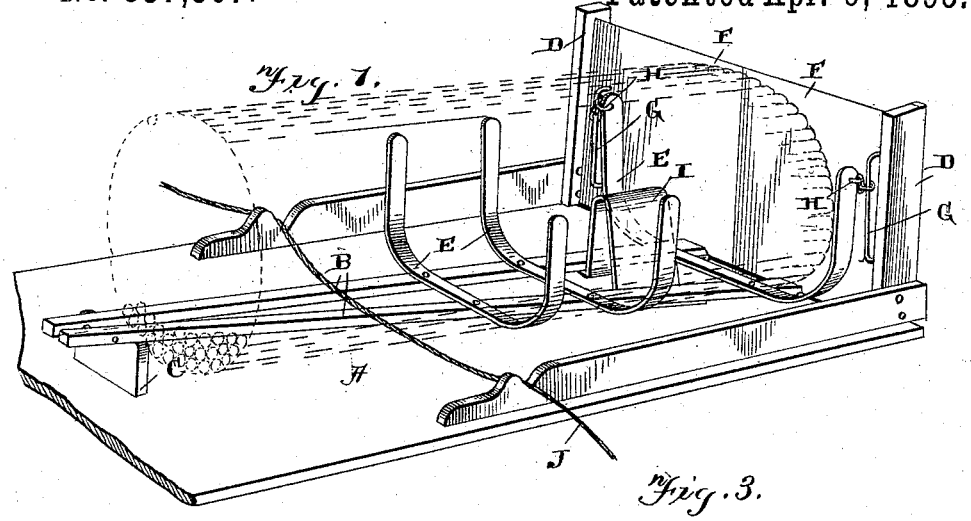
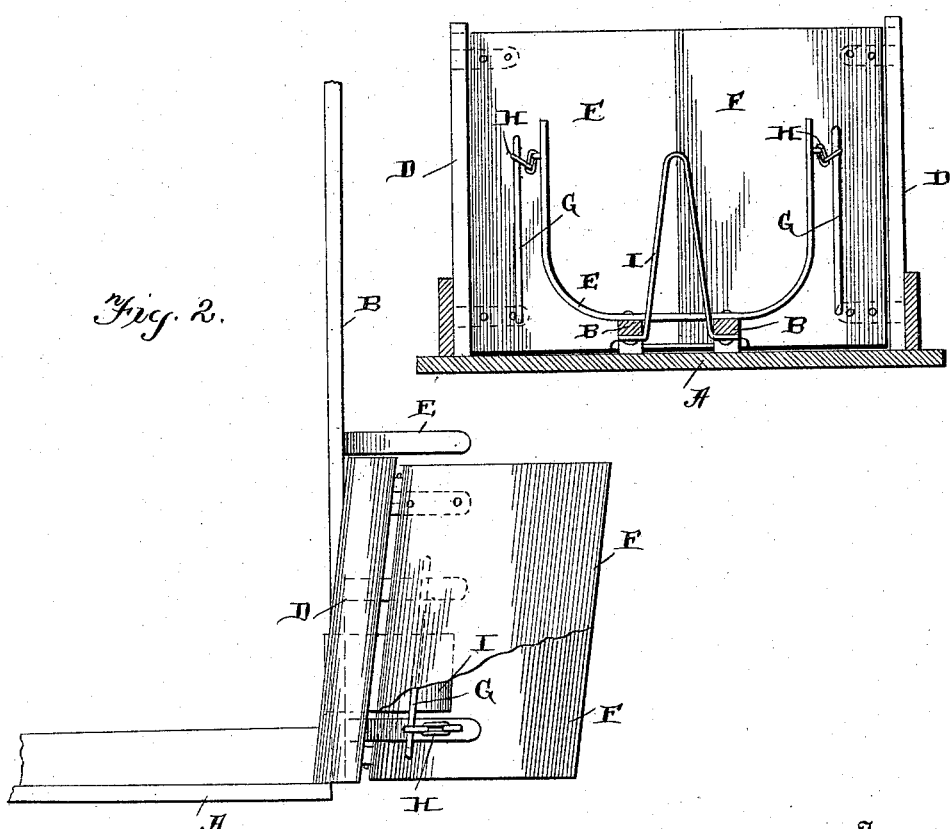
Witnesses
Geo. E. Frech.
James W. Beirard
Inventor
J. A. Shimp
By Lehmann Pattison & Nesbit
Attorneys

UNITED STATES PATENT OFFICE.

JACOB A. SHIMP, OF RIDGEVILLE, ILLINOIS.

CORN-SHOCKER.

SPECIFICATION forming part of Letters Patent No. 537,367, dated April 9, 1895.

Application filed October 18, 1894. Serial No. 526,307. (No model.)

*To all whom it may concern:*

Be it known that I, JACOB A. SHIMP, of Ridgeville, in the county of Iroquois and State of Illinois, have invented certain new and useful Improvements in Corn-Shockers; and I do hereby declare the following to be a full, clear, and exact description of the invention, such as will enable others skilled in the art to which it pertains to make and use it, reference being had to the accompanying drawings, which form part of this specification.

My invention relates to an improved corn shocker; and the object of the same is to provide an improved device for holding the shock while being formed and tied.

A further object is to provide the said device with an improved dump whereby the shock may be easily and quickly removed and placed in an upright position upon the ground.

A further object is to provide an improved device for so forming the shock that it will be effectually ventilated at all times after completion.

The invention consists in the novel features of construction hereinafter fully described and claimed, and illustrated in the accompanying drawings, in which—

Figure 1 is a perspective view of the device. Fig. 2 is a side elevation of the same in a position for discharging the shock. Fig. 3 is a detail view of the connection between the shock holder and one of the hinged gates.

A designates the platform upon which the shocker is mounted and which may be a portion of a corn harvester when the device is used in that connection, and extended vertically from the platform are the posts D.

Hinged to the edge of the platform between the posts are the forwardly extending arms B which at their ends are adapted to rest upon block or support C thereby holding them when lowered in an inclined position. Secured to the upper side of these arms are the bows E which form a cradle for holding the corn as the shock is being formed.

Hinged to uprights D are the gates F which when closed form an abutment for the lower ends of the corn stalks as they are positioned in the cradle thus making said ends even and forming a solid foundation for the shock. Carried by the inner sides of these gates is a loop G which is connected by means of links H to the end of the lower bow E as shown so that when the arms are raised to the position shown in Fig. 2 the said doors or gates will be opened so as to permit the shock to drop to the ground.

Secured to and extended upward between the arms B is the wedge shaped projection I which extends into the space occupied by the shock while being formed and which forms a cavity in the shock for ventilating purposes. It will be readily understood that when the arms are raised for the purpose of discharging the shock the wedge will remain therein until the supporting platform has been moved forward, when the same will retract leaving the ventilating opening in the shock.

The tie band J is arranged across the arms as shown so as to be readily applied to the shock after a sufficient quantity of the corn has been cut to constitute the same.

The cradle arms may be supported in either an inclined or horizontal position but I prefer the inclined as the same can be much more readily raised than when the whole weight must be lifted from a horizontal position.

Having thus fully described my invention, what I claim, and desire to secure by Letters Patent, is—

The combination of a support, an upwardly swinging shock former, gates forming an abutment therefor, hinged to the support loops secured to the gates, and link connections between the said loops and the said hinged shock former, substantially as shown and described.

In testimony whereof I affix my signature in presence of two witnesses.

JACOB A. SHIMP.

Witnesses:
SCOTT BRENNER,
LEE C. BROWN.